United States Patent
Fischer et al.

(10) Patent No.: US 7,647,130 B2
(45) Date of Patent: Jan. 12, 2010

(54) REAL-TIME PREDICTIVE TIME-TO-COMPLETION FOR VARIABLE CONFIGURE-TO-ORDER MANUFACTURING

(75) Inventors: Kari Arlene Fischer, Rochester, MN (US); Ivory Wellman Knipfer, Rochester, MN (US); Kurt David Knodel, Rochester, MN (US); Michael John MacPherson, Elgin, MN (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 11/566,747

(22) Filed: Dec. 5, 2006

(65) Prior Publication Data

US 2008/0133442 A1 Jun. 5, 2008

(51) Int. Cl.
*G06F 19/00* (2006.01)
(52) U.S. Cl. .............. 700/95; 700/97; 700/105
(58) Field of Classification Search ............ 700/95, 700/97, 105
See application file for complete search history.

(56) References Cited

U.S. PATENT DOCUMENTS

| | | | | |
|---|---|---|---|---|
| 5,231,567 A * | 7/1993 | Matoba et al. | ............... | 700/100 |
| 5,307,260 A * | 4/1994 | Watanabe et al. | ............... | 703/2 |
| 5,479,343 A * | 12/1995 | Matoba et al. | ............... | 700/106 |
| 5,586,021 A * | 12/1996 | Fargher et al. | ............... | 700/100 |
| 6,434,443 B1 * | 8/2002 | Lin | ............... | 700/100 |
| 6,564,113 B1 * | 5/2003 | Barto et al. | ............... | 700/99 |
| 6,611,727 B2 | 8/2003 | Bickley et al. | | |
| 6,731,990 B1 | 5/2004 | Carter et al. | | |
| 6,748,287 B1 * | 6/2004 | Hagen et al. | ............... | 700/99 |
| 7,035,815 B1 * | 4/2006 | Henson | ............... | 705/26 |
| 7,054,704 B2 | 5/2006 | Bickley et al. | | |
| 7,113,915 B1 * | 9/2006 | Montemayor et al. | ............... | 705/8 |
| 7,139,720 B1 * | 11/2006 | Foell et al. | ............... | 705/8 |
| 7,218,980 B1 * | 5/2007 | Orshansky et al. | ............... | 700/99 |
| 2004/0019398 A1 | 1/2004 | Pestow, Jr. et al. | | |
| 2004/0230479 A1 * | 11/2004 | Ikeda | ............... | 705/11 |
| 2004/0243457 A1 * | 12/2004 | D'Andrea et al. | ............... | 705/9 |
| 2005/0107902 A1 | 5/2005 | Blouin et al. | | |
| 2005/0159828 A1 * | 7/2005 | Deininger et al. | ............... | 700/87 |
| 2005/0234758 A1 * | 10/2005 | Nishi | ............... | 705/8 |
| 2005/0246043 A1 | 11/2005 | Pestow, Jr. et al. | | |
| 2006/0004618 A1 * | 1/2006 | Brixius | ............... | 705/8 |
| 2006/0031840 A1 | 2/2006 | Yigit et al. | | |
| 2006/0116778 A1 | 6/2006 | Chiang et al. | | |
| 2006/0167736 A1 * | 7/2006 | Weiss | ............... | 705/9 |

* cited by examiner

*Primary Examiner*—Ronald D Hartman, Jr.
(74) *Attorney, Agent, or Firm*—Yee & Associates, P.C.; Steven L. Bennett

(57) ABSTRACT

Predicting a completion time for the manufacturing of an ordered configuration of a product based on actual completion times and self adjusting prediction completion times. An order is received to manufacture a particular configuration of a product. Multiple activities are identified that need to be finished in order to complete the manufacturing of the configuration. A completion time that the configuration will be manufactured is predicted based on actual completion times and self-adjusting predicted completion times for the activities.

19 Claims, 9 Drawing Sheets

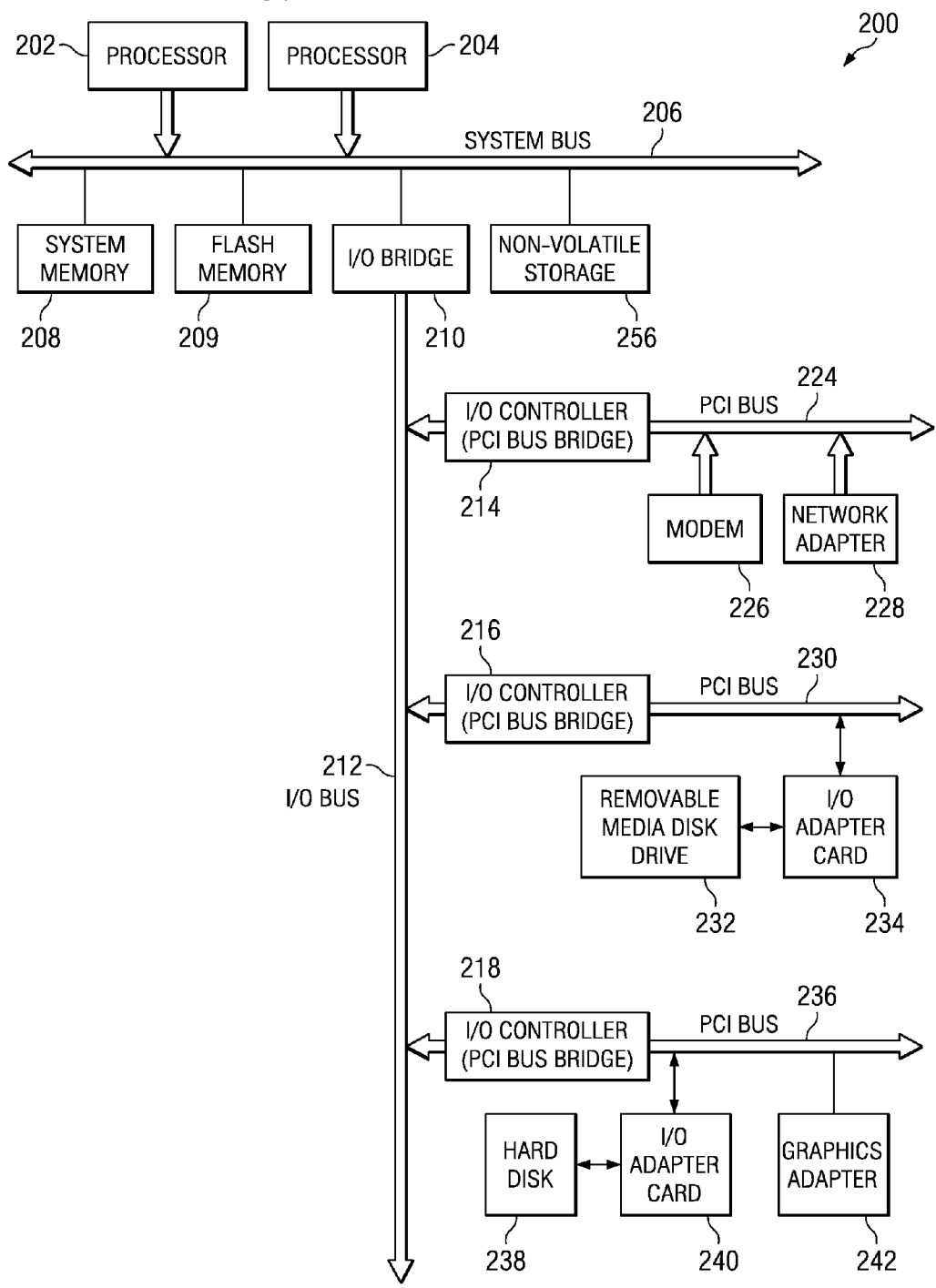

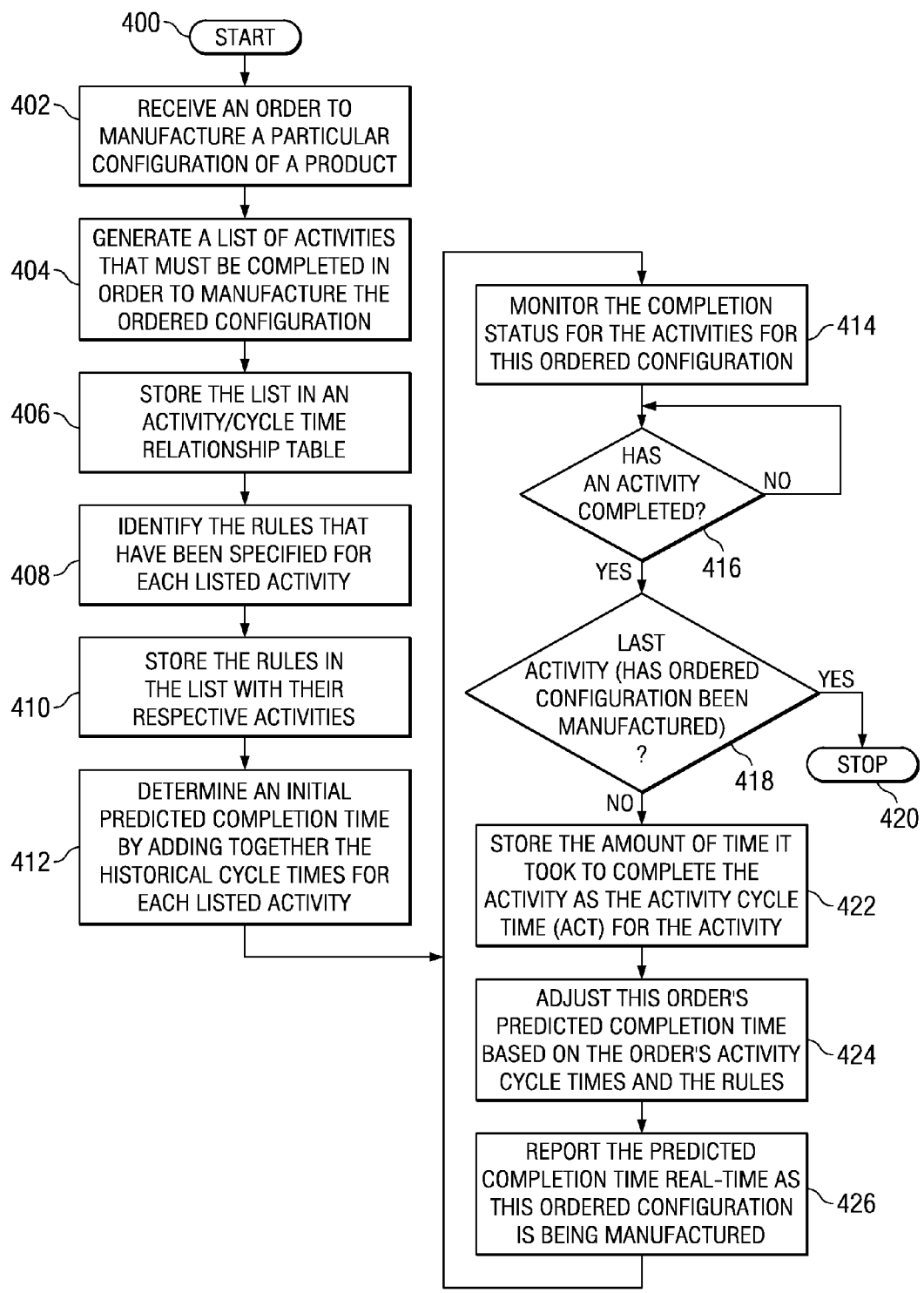

FIG. 6

| ACTIVITY NAME | HISTORICAL CYCLE TIME | PROJECTED CYCLE TIME RULES |
|---|---|---|
| ACTIVITY1 | $HCT_1$ = 60 MINUTES | |
| ACTIVITY2 | $HCT_2$ = 180 MINUTES | IF $(ACT_1)$ THEN $PCT_2 = 3 * ACT_1$ {IF THE ACTUAL CYCLE TIME FOR ACTIVITY1 HAS BEEN COLLECTED, SET THE PROJECTED CYCLE TIME FOR ACTIVITY2 EQUAL TO THREE TIMES THE ACTUAL CYCLE TIME OF ACTIVITY1} |
| ACTIVITY3 | $HCT_3$ = 120 MINUTES | IF $(ACT_1)$ THEN $PCT_3 = ACT_1 * 2$ {IF THE ACTUAL CYCLE TIME FOR ACTIVITY1 HAS BEEN COLLECTED, SET THE PROJECTED CYCLE TIME FOR ACTIVITY3 EQUAL TO TWO TIMES THE ACTUAL CYCLE TIME OF ACTIVITY1} IF $(ACT_2)$ THEN $PCT_3 = ACT_2 - 60$ {THE ACTUAL CYCLE TIME OF ACTIVITY2 CAN BE USED TO GET A MORE ACCURATE PROJECTION FOR ACTIVITY3 CYCLE TIME} |
| ACTIVITY4 | $HCT_4$ = 60 MINUTES | IF $(ACT_1)$ THEN $PCT_4 = ACT_1$ |
| ACTIVITY5 | $HCT_5$ = 30 MINUTES | {NO RULE FOR ACTIVITY 5, NO SIGNIFICANT TIME VARIATIONS} |

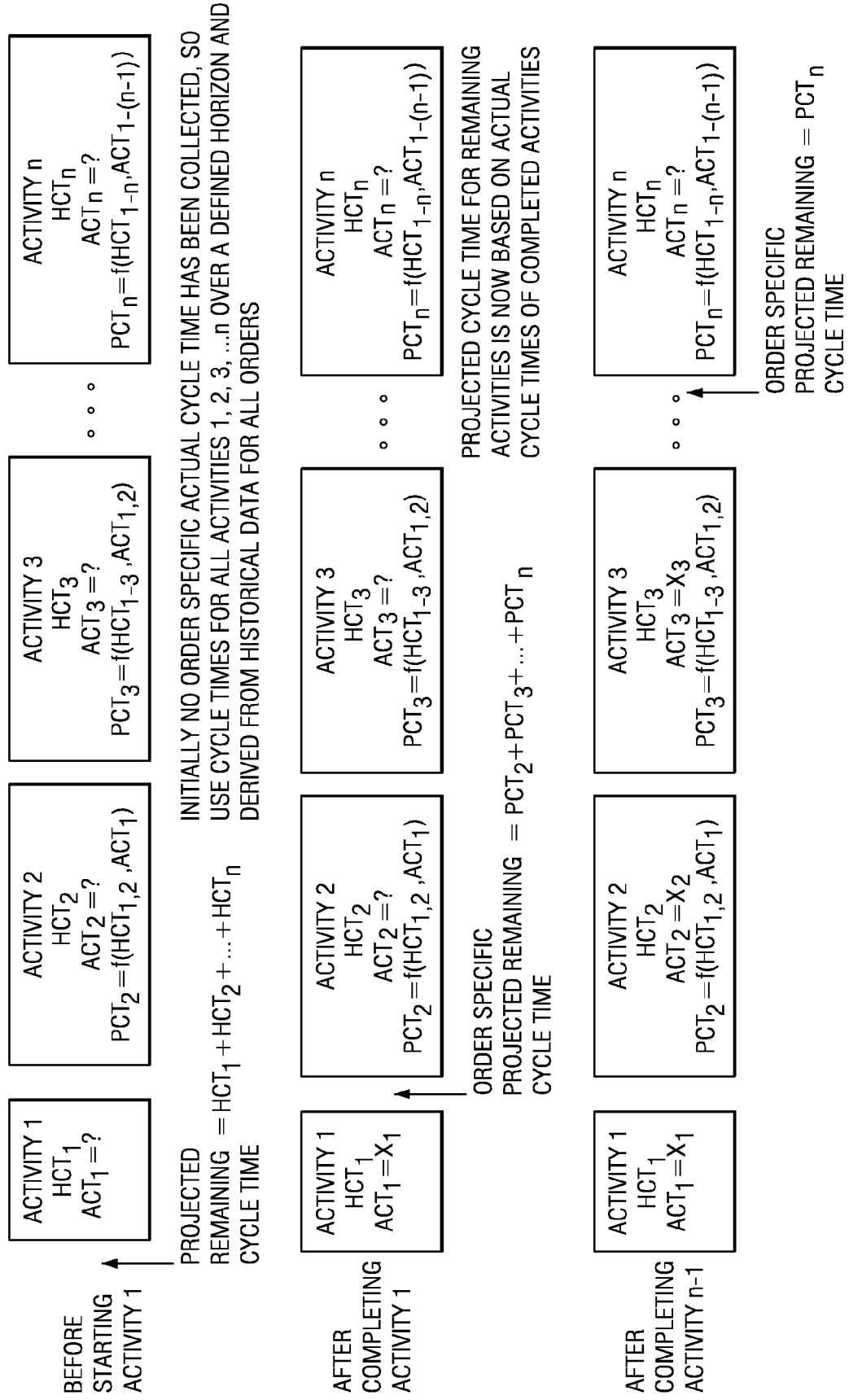

*FIG. 11*

| ACTIVITY | HISTORICAL CYCLE TIME (AVERAGE CONFIGURATION) | 9406 570 CONFIGURATION A (LIGHT) | 9406 570 CONFIGURATION B (HEAVY) |
|---|---|---|---|
| OP320 D1.1 | 15.5 | 11.3 | 31.3 |
| OP320 D1.2 | 10.7 | 7.07 | 40.7 |
| OP320 D1.3 | 37.4 | 37.2 | 45.5 |
| OP320 D2.1 | 16.4 | 10.8 | 41.5 |
| OP320 D2.2 | 14.8 | 9.8 | 55.9 |
| OP320 D2.3 | 37.3 | 37.5 | 44.8 |
| OP320 D3.1 | 16.3 | 10.9 | 41.8 |
| OP320 D3.2 | 5.9 | 3.7 | 22.1 |
| OP320 D3.3 | 37.0 | 37.2 | 45.2 |
| OP320 D3.1 | 16.3 | 11.1 | 41.5 |
| OP320 D3.2 | 10.0 | 6.6 | 40.6 |
| OP320 D3.3 | 36.9 | 37.5 | 44.5 |
| TOTAL | 254.5 | 220.7 | 495.4 |

REAL-TIME PREDICTIVE TIME-TO-COMPLETION FOR VARIABLE CONFIGURE-TO-ORDER MANUFACTURING

BACKGROUND OF THE INVENTION

1. Field of the Invention

The present invention relates generally to a method, apparatus, and product for real-time predictive time-to-completion for variable configure-to-order manufacturing.

2. Description of the Related Art

When products are "built to customer order" there is often substantial variability in the products being produced, even within different configurations of a single product. A product can be configured in many different ways. For example, a customer could choose to order a product. The customer would then select the options that the customer is interested in having included in the customer's particular configuration of the product. These options could include different memory types/sizes/speeds, different storage devices, different processors, etc. In computer products, this variability can be many combinations of hardware, software, and instructional features. The effect of this variability is significant time differences in the processes (such as kitting, build, test, and software preload) used to manufacture the configuration of a product that a customer ordered.

Manufacturing historically uses average cycle times, referred to herein as "historical cycle times". A cycle time is the amount of time it takes for a manufacturing activity to be completed. A few examples of manufacturing activities include: power up with built-in self tests, wait for all resources to report in; checking microcode levels; surface scan of hard drives; start up/halting of exercises; configuring of hardware, such as enabling redundancy of hard drive arrays; and loading of software images.

The historical cycle time for an activity is determined over a course of time during which the activity was performed for many different configurations of a product. Thus, the historical cycle time is not determined on an order-by-order basis. It represents an average that was determined by taking the time it took to complete the activity for all ordered configurations of a product that required this activity divided by the number of times that the activity was completed.

FIG. 8 depicts a calculation of a historical cycle time for an activity in accordance with the prior art. The process starts as illustrated by block 800 and passes to block 802 which depicts, for all ordered configurations of a particular product, monitoring the time it takes to complete an activity. Next, block 804 illustrates calculating the average time it took to complete the activity. The average time is calculated by adding together the time it took to complete the activity for each ordered configuration, and then dividing the total time by the number of times the activity was completed. The process then terminates as depicted by block 806.

Automated solutions that predict order completion times, which utilize time estimates for each operation, assume a "typical" configuration. Configuration variations of a product are not factored in. Due to the huge variability within each product, it is not practical to develop estimates for every possible configuration. Because the estimates are not reliable on an order-by-order basis, the estimates are either not used or, worse yet, prompt incorrect decisions.

Manual solutions to interrogate each ordered configuration during the production activities is labor intensive and error prone. It is nearly impossible to synthesize the data to make accurate projections, and expert skills are required to perform this analysis. These are the same skills required to support production. Using the expert skills to make projections drives inefficiency in manufacturing, making the situation worse.

Therefore, known automated solutions for predicting a completion time for completing the manufacturing of an ordered configuration of a product use the historical cycle times. FIG. 9 illustrates estimating the amount of time it will take to manufacture the particular configuration of a product that has been ordered in accordance with the prior art. The process starts as depicted by block 900 and then passes to block 902 which illustrates receiving an order to manufacture a particular configuration of a product. Thereafter, block 904 depicts identifying the activities that are necessary to manufacture the ordered configuration. Next, block 906 illustrates retrieving the historical cycle times for each identified activity. Block 908 then depicts estimating the amount of time it will take to manufacture the ordered configuration by adding together the historical cycle times for each identified activity. The process then terminates as illustrated by block 910.

FIG. 10 depicts the calculation of the predicted completion time in accordance with the prior art. Prior to completing any activity, the predicted completion time that an ordered configuration of a product will be completely manufactured is equal to the sum of the historical cycle times for each activity. After completing an activity, the predicted completion time is equal to the historical cycle times of the remaining activities.

Because the known automated solutions assume a "typical" configuration of a product, the automated solutions do not provide an accurate prediction of the time it will take to completely manufacture an ordered configuration of a product. FIG. 11 is a table that lists the historical cycle times for each of a plurality of activities as well as the actual cycle times for two different configurations, configuration A and configuration B, of a particular product, 9406 570.

Using the historical cycle times, the known solutions will predict that it will take 254.5 units of time to manufacture product 9406 570. This prediction may not be very accurate for the configurations of the product that are actually ordered, however. For example, a "light" configuration of the product might be ordered. As depicted by FIG. 11, it would take only 220.7 units of time to manufacture the "light" configuration. Alternatively, a "heavy" configuration might be ordered. It would take 495.4 units of time to manufacture the "heavy" configuration.

Several different factors contribute to the variability in the time it takes to manufacture a configuration of a product. For example, for computer systems, the quantity and size of the memory; the capacity, speed, and quantity of the storage devices; the number and speed of the processors; the quantity and type of the I/O adapters; and the physical placement of all of the components in the physical enclosures determine the amount of time a particular configuration of product will require for manufacturing.

The "light" and "heavy" configurations are different configurations of the same product. Because an average is used to predict the manufacturing times for each activity, the predicted completion time will not be accurate for either the "light" or "heavy" configuration.

The historical cycle times are estimates that are based on the manufacturing history of multiple different ordered configurations. These orders might have included "light" configurations, "heavy" configurations, or, most probably, a combination of both types of configurations. Because these are averages, they cannot be used to accurately predict the manufacturing times of individual orders.

BRIEF SUMMARY OF THE INVENTION

The illustrative embodiment is an automated process that can be used to accurately predict the process manufacturing completion times for variably configured build-to-order products. The predicted completion time is generated on an order-by-order basis and is specific to a particular order.

The illustrative embodiment analyzes the actual cycle times for a particular configuration of a product. An initial predicted completion time is made that is based on the historical cycle times for each necessary activity. Once manufacturing has commenced and one or more activities have completed, the actual time it took to complete these activities is used to adjust the predicted cycle time of the remaining activities. The predicted completion time is then updated in real-time as the product is being manufactured, based on these adjusted predicted cycle times for the remaining activities.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a block diagram of a computer system that includes the illustrative embodiment;

FIG. 4 is a high level flow chart that illustrates determining and reporting a self-adjusting predicted completion time in accordance with the illustrative embodiment;

FIG. 6 illustrates an activity/cycle time relationship table for the particular configuration of a product that has been ordered in accordance with the illustrative embodiment;

FIG. 7 depicts the calculation of the predicted completion time in accordance with the illustrative embodiment;

FIG. 11 is a table that lists the historical cycle times for each of a plurality of activities as well as the actual cycle times for two different configurations of a product in accordance with the prior art.

DETAILED DESCRIPTION OF THE INVENTION

Figure 1:
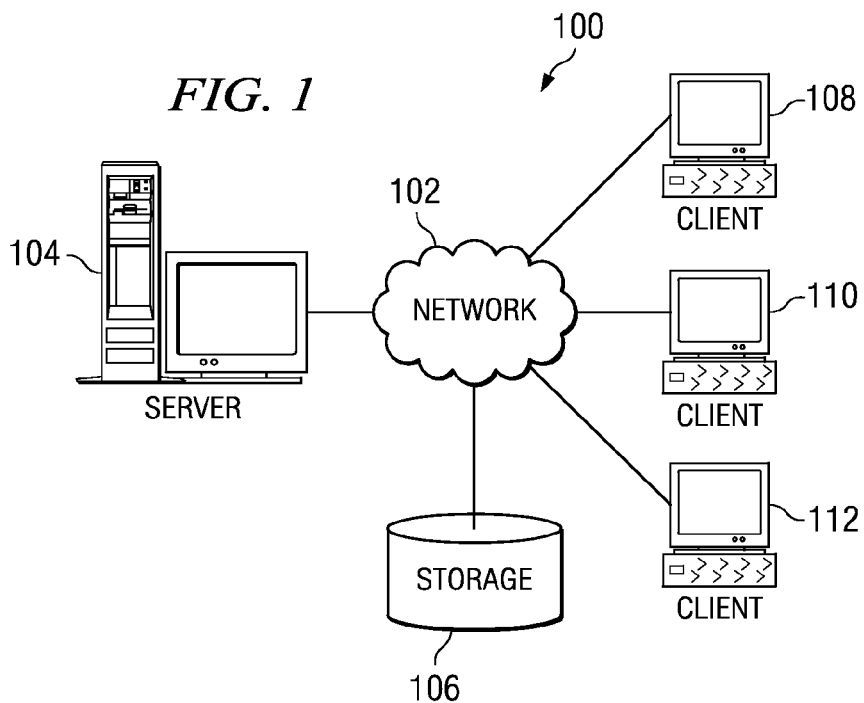
FIG. 1 is a pictorial representation of a network of computer systems that includes the illustrative embodiment.

The present invention is a method, apparatus, and computer program product for real-time predictive time-to-completion for variable configure-to-order manufacturing. The predicted completion time is generated on an order-by-order basis and is specific to a particular order.

The illustrative embodiment predicts a time when a particular ordered configuration will be completely manufactured. The predicted completion time is self-adjusting, based on the actual completion times of activities that have been finished for the specific order and predicted cycle times for the remaining, unfinished activities.

In order to manufacture a configuration of a product that was ordered by a customer, certain activities must be completed, or finished. Once an activity has been finished, the actual amount of time (referred to herein as an "activity cycle time") that it took to complete that activity can be obtained. The illustrative embodiment uses the activity cycle times for completed activities to predict the amount of time that it will take to finish the remaining activities. The predicted completion time for this order is then calculated using the activity cycle times and predicted cycle times.

As additional activities are completed, the predicted cycle times for the remaining activities are then recalculated using the activity cycle times of the activities that are now completed. The predicted completion time is updated using the activity cycle times of the completed activities and the recalculated predicted cycle times of the activities that now remain to be completed.

When an order is received to build a particular configuration of a product, historical cycle times (HCTs) are used to predict a completion time that the ordered configuration will be completely manufactured. Each ordered configuration will require the completion of particular activities to manufacture the ordered configuration. There is a historical cycle time for each one of these necessary activities. An initial predicted completion time for this particular order is calculated by adding together each one of these historical cycle times. This initial predicted completion time is calculated prior to beginning the manufacturing of the ordered configuration, i.e. prior to completing any one of these activities.

The manufacturing process is then begun by completing the first activity that is necessary to manufacture the ordered configuration. Once the first activity has been completed, the activity cycle time (ACT) is obtained for this activity. An activity cycle time (ACT) is the actual amount of time that is taken to complete the activity for an ordered configuration. Therefore, the ACT for the first activity is the actual amount of time it took to complete the first activity for this ordered configuration.

After the activity cycle time for the first activity is obtained, a predicted cycle time (PCT) for each remaining activity is then calculated. One or more calculation rules can be specified for each activity. These one or more rules are used to calculate a predicted cycle time for each activity. A much more accurate completion time is obtained when predicted cycle times are used instead of the historical cycle times.

Once the activity cycle time for the first activity is obtained, the initial predicted completion time is adjusted. The adjusted predicted completion time is calculated by adding together the activity cycle time for the first activity plus the predicted cycle times for each remaining activity.

The second activity is then completed. Predicted cycle times for each remaining activity are then recalculated. A new predicted completion time is then calculated. This new predicted completion time is calculated by adding together the activity cycle time for the first and second activities plus the recalculated predicted cycle times for each remaining activity. This process is then repeated as each subsequent activity is completed.

Prior to describing the illustrative embodiment in detail, data processing systems are described that can be used to implement the illustrative embodiment.

FIG. 1 is a pictorial representation of a network of computer systems that includes the illustrative embodiment. Network data processing system 100 is a network of computers in which the preferred embodiment may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers, network computers, or other computing devices. In the depicted example, server 104 provides data, such as boot files, operating system images, and applications, to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages.

Of course, network data processing system 100 also may be implemented as a number of different types of networks, such as for example, an intranet, a local area network (LAN), a wide area network (WAN), or a wireless network. FIG. 1 is intended as an example, and not as an architectural limitation for the preferred embodiment.

FIG. 2 is a block diagram of a computer system that includes the illustrative embodiment. Computer system 200 may be a symmetric multiprocessor (SMP) system including a plurality of processors 202 and 204 connected to system bus 206. Alternatively, a single processor system may be employed. Also connected to system bus 206 are system memory 208, flash memory 209, and non-volatile storage (NV-RAM) 256. I/O bus bridge 210 is connected to system bus 206 and provides an interface to I/O bus 212.

System 200 includes one or more I/O controllers. According to the depicted embodiment, each I/O controller is implemented as a PCI Bus Bridge. Those skilled in the art will recognize that other technologies may be used to implement an I/O controller.

Peripheral component interconnect (PCI) bus bridge 214 connected to I/O bus 212 provides an interface to PCI local bus 224. A number of modems may be connected to PCI bus 224. Typical PCI bus implementations will support four PCI expansion slots or add-in connectors. Communications links to other computers may be provided through modem 226 and network adapter 228 connected to PCI local bus 224 through add-in boards. In this manner, data processing system 200 allows connections to multiple external network computers.

PCI bus bridge 216 is connected to PCI local bus 230. A storage device, such as a media disk drive 232, is included in system 200. A storage device, such as a disk drive 232 capable of receiving removable media, is included in system 200. Removable media includes DVD-ROMs, CD-ROMs, floppy disk, tapes, and other media. Media disk drive 232 is coupled to PCI bus 230 via an I/O adapter card 234.

PCI bus bridge 218 is connected to PCI local bus 236. Another storage device, such as a hard disk drive 238, is included in system 200. Hard disk drive 238 is coupled to PCI bus 236 via an I/O adapter card 240. A memory-mapped graphics adapter 242 may also be connected to I/O bus 236 as depicted.

Those of ordinary skill in the art will appreciate that the hardware depicted in FIGS. 1 and 2 may vary. For example, other peripheral devices, such as optical disk drives and the like, also may be used in addition to or in place of the hardware depicted. The depicted example is not meant to imply architectural limitations with respect to the preferred embodiment.

Figure 3:
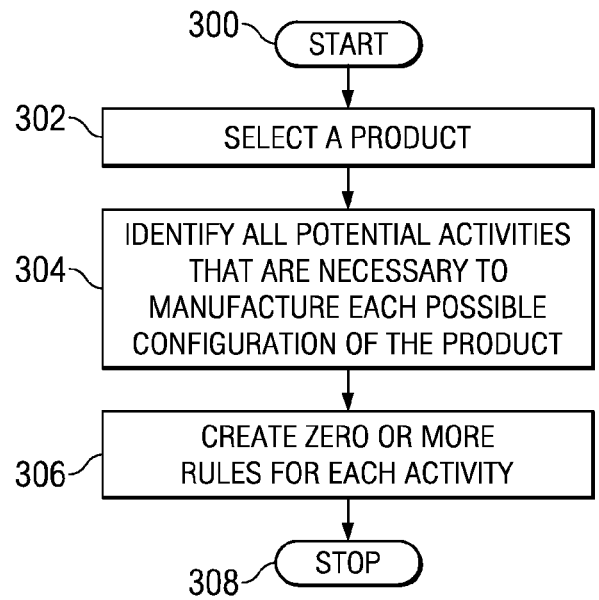
FIG. 3 is a high level flow chart that depicts the creation of rules for all activities in accordance with the illustrative embodiment.

FIG. 3 is a high level flow chart that depicts the creation of rules for manufacturing activities of a given product in accordance with the illustrative embodiment. The process starts as depicted by block 300 and then passes to block 302 which illustrates selecting a product. Next, block 304 depicts identifying all potential activities that must be completed to manufacture any configuration of the product. Many different configurations of a product can be ordered. The activities that must be completed are dependent on what configuration has been ordered. Next, block 306 depicts creating zero or more rules for each activity. The process then terminates as depicted by block 308.

FIG. 4 is a high level flow chart that illustrates determining and reporting a self-adjusting predicted completion time for the specific configuration of a product that has been ordered in accordance with the illustrative embodiment. The process starts as depicted by block 400. Next, block 402 illustrates receiving an order to manufacture a particular configuration of a product. Block 404, then, depicts generating the list of activities that must be completed in order to manufacture the ordered configuration.

The process then passes to block 406 which illustrates storing the list in an activity/cycle time relationship table. Thereafter, block 408 depicts identifying the rules that have been specified for each one of the listed activities. Each rule is used to calculate a predicted cycle time for an activity. Next, block 410 illustrates storing the identified rules in the list with their respective activities. Thereafter, block 412 depicts determining an initial predicted completion time by adding together the historical cycle times for each listed activity. Block 414, then, illustrates monitoring the completion status for the activities for this ordered configuration.

Next, block 416 depicts a determination of whether or not one of the activities that is necessary to manufacture the ordered configuration has completed. If a determination is made that none of the activities has completed, the process passes back to block 416. Once any one of activities has completed, the process passes to block 418 which illustrates a determination of whether or not the completed activity is the last activity. When the last activity has been completed, the ordered configuration has been manufactured. If a determination is made that the activity is the last activity, the process terminates, as illustrated by block 420.

Referring again to block 418, if a determination is made that the completed activity is not the last activity, the process passes to block 422 which depicts storing the amount of time that it took to complete the activity as the activity cycle time (ACT) for this activity.

Figure 5:
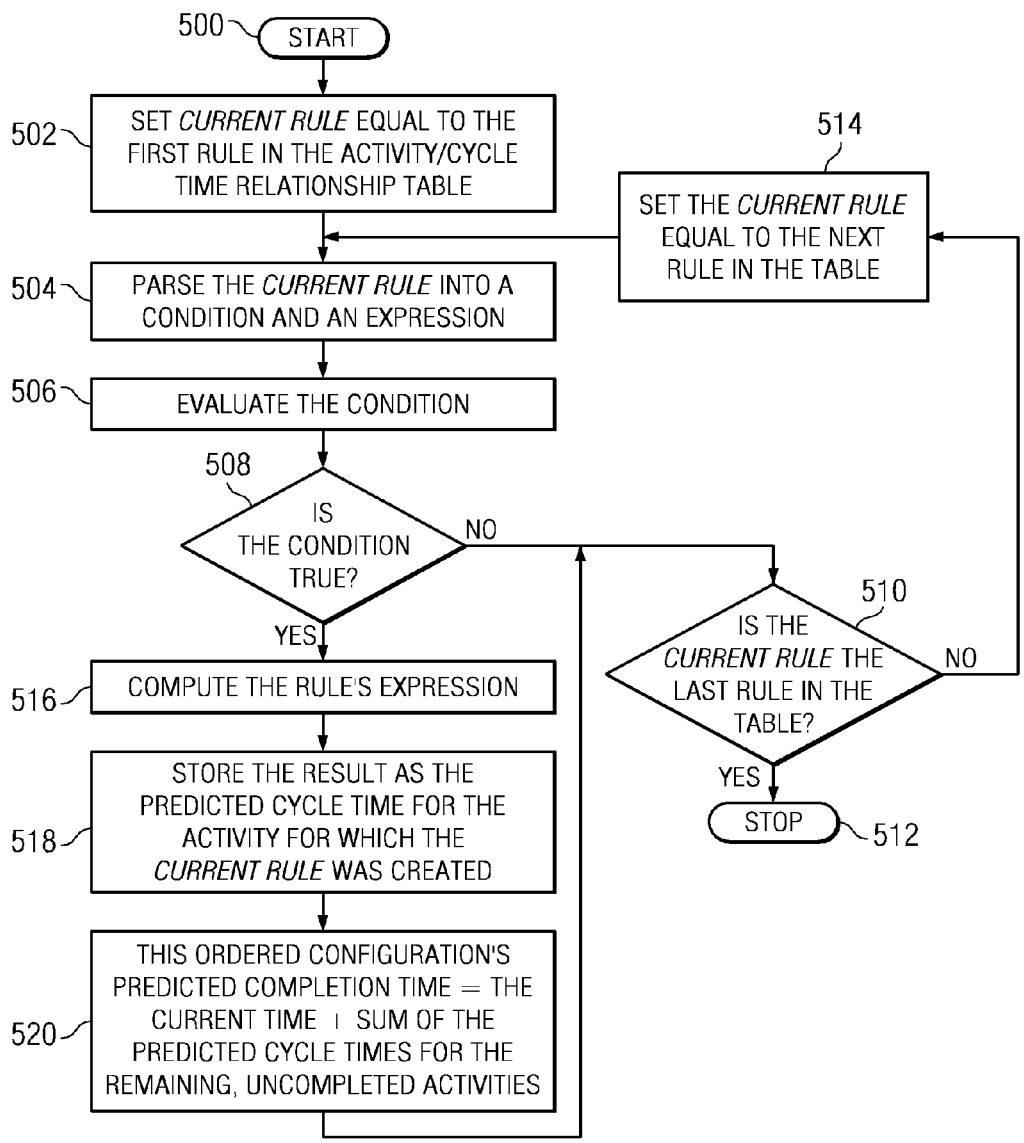
FIG. 5 illustrates the process of adjusting a predicted completion time for the particular configuration of a product that has been ordered in accordance with the illustrative embodiment.
Figure 8:
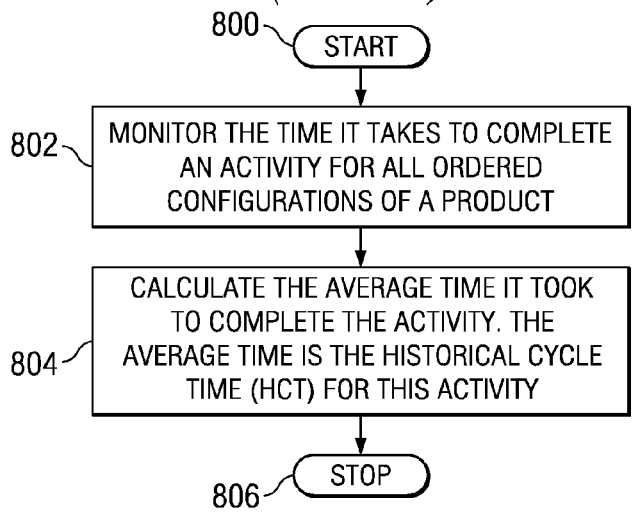
FIG. 8 depicts a calculation of a historical cycle time for an activity in accordance with the prior art.
Figure 9:
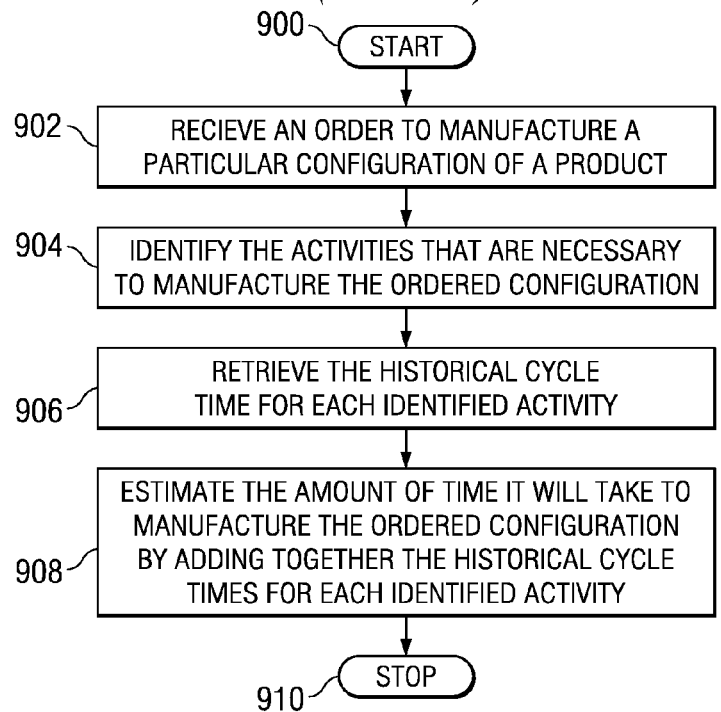
FIG. 9 illustrates estimating the amount of time it will take to manufacture the particular configuration of a product that has been ordered in accordance with the prior art.
Figure 10:
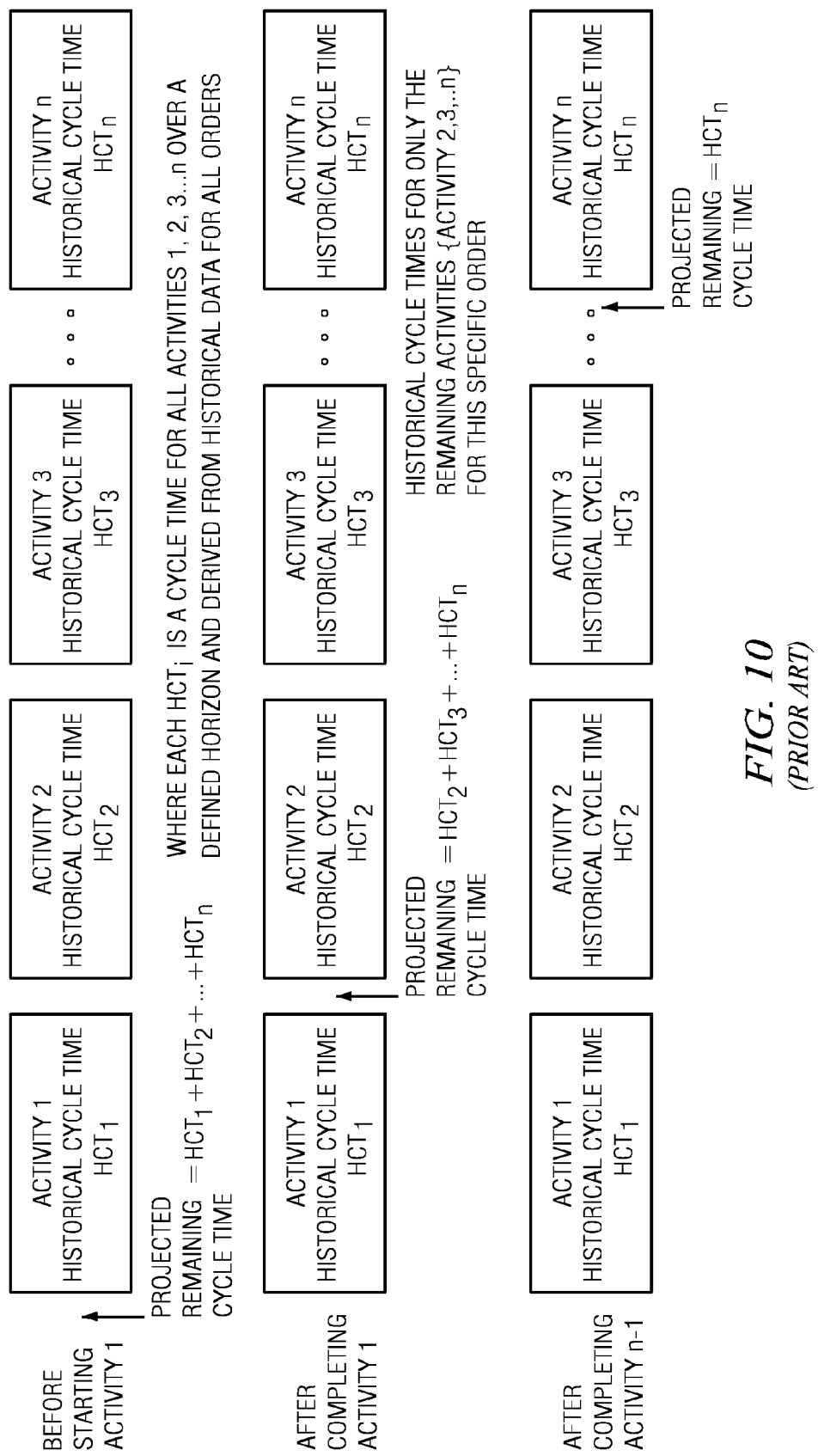
FIG. 10 depicts the calculation of the predicted completion time in accordance with the prior art.

Thereafter, block 424 illustrates adjusting this order's predicted completion time based on the order's activity cycle times and the rules. FIG. 5 depicts the process of adjusting this order's predicted completion time in more detail. Referring again to FIG. 4, block 426 illustrates reporting the predicted completion time real-time as this ordered configuration is being manufactured. The process then passes back to block 414.

FIG. 5 illustrates the process of adjusting a predicted completion time for the particular configuration of a product that has been ordered in accordance with the illustrative embodiment. Zero or more rules can be created for an activity. Each rule defines the calculation for determining a predicted cycle time for the activity for which the rule was created.

The process starts as depicted by block 500. Next, block 502 illustrates setting the CURRENT RULE equal to the first rule in the activity/cycle time relationship table. Block 504, then, depicts parsing the CURRENT RULE into a condition and expression. Thereafter, the condition is evaluated, as illustrated by block 506. Block 508 illustrates a determination of whether or not the condition is true. If the condition is false, the process passes to block 510; if the condition is true, the process passes to block 516.

Block 510 depicts a determination of whether or not the CURRENT RULE is the last rule in the table. If the CURRENT RULE is the last rule in the table, the process terminates; if the CURRENT RULE is not the last rule in the table, the process passes to block 514. Block 514 illustrates setting the CURRENT RULE equal to the next rule in the table. The process then passes back to block 504.

Referring again to block 508, if the condition is true, the process passes to block 516 which illustrates computing the rule's expression. Next, block 518 depicts storing the result of the computation as the predicted cycle time for the activity for which the CURRENT RULE was created. Thereafter, block 520 illustrates the ordered configuration's predicted completion time being equal to the current time plus the sum of the predicted cycle times for the remaining, uncompleted activities. The process then passes back to block 510.

FIG. 6 illustrates an activity/cycle time relationship table for the particular configuration of a product that has been ordered in accordance with the illustrative embodiment.

An activity/cycle time relationship table is created for each order. Different activities may be specified for each order. For example, a first product might require activities 1-5 to be completed, while a second product might require activities 1, 2, 6, and 9 to be completed. Each activity that must be completed to manufacture the ordered product is listed in the activity/cycle time relationship table.

A historical cycle time exists for each activity. Although the historical cycle times are not determined by the illustrative embodiment or included in the table, they are depicted here in order to describe the illustrative embodiment.

Zero or more rules are also created for each activity. These rules, if they exist, are also stored in the table with their respective activities. The calculation of a rule provides a predicted cycle time for an activity. If no rule has been created for an activity, the historical cycle time for that activity is used as the predicted cycle time for the activity.

FIG. 6 depicts an example activity/cycle time relationship table for an ordered product. Activities 1-5 must be completed in order to manufacture the product.

If the process according to the prior art were used to predict the completion time to manufacture the ordered product, the historical cycle times for each activity would be added together to produce the predicted completion time. Thus, the predicted completion time for this product was HCT1+HCT2+HCT3+HCT4+HCT5; thus, the predicted completion time was 60+180+120+60+30.

According to the illustrative embodiment, rules have been created for activities 2-4. No rule has been created for activities 1 or 5.

One rule has been created for activity 2. The rule for activity 2 depends on the activity cycle time (ACT) for activity 1. The amount of time it took to complete activity 1 is ACT1. The rule's condition is: ACT1. Thus, when activity 1 has been completed, the condition for this rule is true. The rule's expression is: PCT2=3(ACT1). PCT2 is the predicted cycle time for activity 2. Therefore, when activity 1 has been completed, the predicted cycle time for activity 2 can be calculated. The predicted cycle time for activity 2 is three times the time it took to complete activity 1.

Two rules have been created for activity 3. The first rule for activity 3 depends on the activity cycle time (ACT) for activity 1. The first rule's condition is: ACT1. Thus, when activity 1 has been completed, the condition for the first rule is true. The first rule's expression is: PCT3=2(ACT1). PCT3 is the predicted cycle time for activity 3. Therefore, when activity 1 has been completed, the predicted cycle time for activity 3 can be calculated. The predicted cycle time for activity 3 is two times the time it took to complete activity 1.

A more accurate predicted cycle time for activity 3 can be made once activity 2 has been completed. Therefore, a second rule has been created for activity 3. The second rule's condition is: ACT2. Thus, when activity 2 has been completed, the condition for the second rule is true. The second rule's expression is: PCT3=ACT2−60.

One rule has been created for activity 4. The rule for activity 4 depends on the activity cycle time (ACT) for activity 1. The rule's condition is: ACT1. Thus, when activity 1 has been completed, the condition for this rule is true. The rule's expression is: PCT4=ACT1. PCT4 is the predicted cycle time for activity 4. Therefore, when activity 1 has been completed, the predicted cycle time for activity 4 can be calculated. The predicted cycle time for activity 4 is the time it took to complete activity 1.

No rule has been created for rule 5. Therefore, the predicted cycle time for activity 5 is equal to the historical cycle time for activity 5.

According to the illustrative embodiment, the predicted completion time for an ordered configuration of a product is adjusted each time a required manufacturing activity is completed. Before any activity has been completed, an initial predicted completion time for the ordered configuration is equal to the sum of all of the historical cycle times for each activity. After an activity has been completed, the expression for each rule is computed, which produces predicted cycle times for the rules. The predicted completion time for the order is then equal to the current time plus the sum of the predicted cycle times for each activity.

After the next activity is completed, the expression for each rule is once again computed. The predicted cycle times for each activity are then adjusted, if necessary, and the predicted completion time for the ordered configuration is also adjusted. This process repeats each time an activity is completed until all activities have been completed.

For example, after activity 1 has been completed, PCT2=3(ACT1); PCT3=2(ACT1); PCT4=ACT1; and PCT5=HCT5. The predicted completion time is the current time plus the sum of the predicted cycle times for all remaining activities. Therefore, the predicted completion time for the ordered configuration is: the current time+PCT2+PCT3+PCT4+PCT5, which is equal to the current time+3(ACT1)+2(ACT1)+ACT1+HCT5.

After activity 2 has been completed, only activities 3-5 remain to be completed. After activity 2 has been completed, PCT3=ACT2−60; PCT4=ACT1; and PCT5=HCT5. Therefore, the predicted completion time for the ordered configuration is now the current time+[ACT2−60]+ACT1+HCT5.

As described above, the predicted completion time for the ordered configuration is self-adjusting and changes each time an activity has been completed.

FIG. 7 depicts the calculation of the predicted completion time in accordance with the illustrative embodiment. Prior to completing any activity, the predicted completion time is equal to the sum of the historical cycle times for each activity. After completing the first activity, the predicted cycle times for the remaining activities are based on the actual cycle times of the completed activities.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computer system for predicting a completion time for manufacturing a particular configuration of a product, the method comprising:
   receiving, at a data processing system, an order to manufacture the configuration of the product;
   identifying, by a processing unit of the data processing system, a plurality of activities that must be finished in order to completely manufacture the configuration, wherein each activity in the plurality of activities has one or more associated rules for calculating a predicted cycle time for an activity;
   calculating, by the processing unit, an initial predicted completion time by adding historical cycle times for each activity in the plurality of activities;
   responsive to completion of an activity in the plurality of activities, determining, by the processing unit, an actual amount of time the activity took to complete;
   predicting, by the processing unit, an amount of time that it will take incomplete activities of the plurality of activities to complete using the actual amount of time the completed activity took to complete and the one or more associated rules for calculating a predicted cycle time for an activity;
   recalculating, by the processing unit, the initial predicted completion time using the actual amount of time of the completed activity and the predicted amount of time of the incomplete activities to form a recalculated prediction time that it will take to manufacture the configuration; and
   reporting, by the processing unit, the recalculated prediction completion time as the configuration of the product is being manufactured.

2. The method according to claim 1, further comprising:
   completing additional incomplete activities of the plurality of activities to form additional completed activities; and
   predicting an updated amount of time that it will take to complete remaining incomplete activities of the plurality of activities using an actual amount of time that it took to complete the additional completed activities.

3. The method according to claim 1, further comprising:
   updating the predicted completion time as additional ones of the plurality of activities complete.

4. The method according to claim 1, further comprising:
   for each incomplete activity of the plurality of activities, defining the one or more associated rules that state a predicted amount of time that it will take to complete the incomplete activity of the plurality of activities as a function of an actual amount of time taken for at least one completed activity of the plurality of activities.

5. The method according to claim 1, further comprising:
   identifying the plurality of activities from a second plurality of activities in response to the receipt of the order;
   for each incomplete activity of the second plurality of activities, defining the one or more associated rules that state a predicted amount of time that it will take to complete an incomplete activity of the second plurality of activities as a function of an actual amount of time taken for at least one completed activity of the second plurality of activities;
   identifying the one or more associated rules that have been defined for the incomplete activity of the second plurality of activities; and
   for each incomplete activity of the second plurality of activities, using the one or more associated rules identified for the incomplete activity in the second plurality of activities to predict an amount of time that it will take to complete the incomplete activity in the second plurality of activities.

6. The method according to claim 1, further comprising:

monitoring a completion status for each incomplete activity of the plurality of activities that indicates when each incomplete activity of the plurality of activities completes; and in response to one of the plurality of activities completing, updating the predicted amount of time that it will take to complete incomplete activities of the plurality of activities using an actual amount of time that it took to complete completed activities in the plurality of activities, wherein the predicted amount of time is updated when each incomplete activity of the plurality of activities completes.

7. The method according to claim 6, further comprising:

in response to updating the predicted amount of time, updating the predicted completion time, wherein the predicted completion time is updated when each incomplete activity of the plurality of activities completes.

8. The method according to claim 1, further comprising:

repeating the calculating, predicting, recalculating, and reporting steps each time an incomplete activity in the plurality of activities completes.

9. The method according to claim 1, wherein the recalculated prediction time comprises a sum of actual amounts of time for completed activities and predicted amounts of time for incomplete activities.

10. A computer program product in a computer usable medium having computer usable program code stored thereon, the computer usable program code for execution by a computer, comprising:

computer usable program code for receiving an order to manufacture the configuration of the product;

computer usable program code for identifying a plurality of activities that must be finished in order to completely manufacture the configuration, wherein each activity in the plurality of activities has one or more associated rules for calculating a predicted cycle time for an activity;

computer usable program code for calculating an initial predicted completion time by adding historical cycle times for each activity in the plurality of activities;

computer usable program code for determining, in response to completion of an activity in the plurality of activities, an actual amount of time the activity took to complete;

computer usable program code for predicting an amount of time that it will take incomplete activities of the plurality of activities to complete using the actual amount of time the completed activity took to complete and the one or more associated rules for calculating a predicted cycle time for an activity;

computer usable program code for recalculating the initial predicted completion time using the actual amount of time of the completed activity and the predicted amount of time of the incomplete activities to form a recalculated prediction time that it will take to manufacture the configuration; and computer usable program code for reporting the recalculated prediction completion time as the configuration of the product is being manufactured.

11. The computer program product according to claim 10, further comprising:

computer usable program code for completing additional incomplete activities of the plurality of activities to form additional completed activities; and computer usable program code for predicting an updated amount of time that it will take to complete remaining incomplete activities of the plurality of activities using an actual amount of time that it took to complete the additional completed activities.

12. The computer program product according to claim 10, further comprising:

computer usable program code updating the predicted completion time as additional ones of the plurality of activities complete.

13. The computer program product according to claim 10, further comprising:

for each incomplete activity of the plurality of activities, computer usable program code for defining one or more rules that state a predicted amount of time that it will take to complete the incomplete activity of the plurality of activities as a function of an actual amount of time taken for at least one completed activity of the plurality of activities.

14. The computer program product according to claim 13, further comprising:

computer usable program code for identifying the plurality of activities from a second plurality of activities in response to the receipt of the order;

for each incomplete activity of the second plurality of activities, computer usable program code for defining one or more rules that state a predicted amount of time that it will take to complete an incomplete activity of the second plurality of activities as a function of an actual amount of time taken for at least one completed activity of the second plurality of activities;

computer usable program code for identifying one or more rules that have been defined for the incomplete activity of the second plurality of activities; and for each incomplete activity of the second plurality of activities, computer usable program code for using the one or more rules identified for the incomplete activity in the second plurality of activities to predict an amount of time that it will take to complete the incomplete activity in the second plurality of activities.

15. The computer program product according to claim 10, further comprising:

computer usable program code for monitoring a completion status for each incomplete activity of the plurality of activities that indicates when each incomplete activity of the plurality of activities completes; and in response to one of the plurality of activities completing, computer usable program code for updating the predicted amount of time that it will take to complete incomplete activities of the plurality of activities using an actual amount of time that it took to complete completed activities in the plurality of activities, wherein the predicted amount of time is updated when each incomplete activity of the plurality of activities completes.

16. The computer program product according to claim 15, further comprising:

in response to updating the predicted amount of time, computer usable program code for updating the predicted completion time, wherein the predicted completion time is updated when each incomplete activity of the plurality of activities completes.

17. An apparatus in a computer system comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to receive an order to manufacture the configuration of the product; identify a plurality of activities that must be finished in order to completely manufacture the configuration, wherein each activity in the plurality of activities has one or more associated rules for calculating a predicted cycle time for an activity; calculate an initial predicted completion time by adding historical cycle times for each activity in the plurality of activities; responsive to completion of an activity in the plurality of activities, determine an actual amount of time the activity took to complete; predict an amount of time that it will take incomplete activities of the plurality of activities to complete using the actual amount of time the completed activity took to complete and the one or more associated rules for calculating a predicted cycle time for an activity; recalculate the initial predicted completion time using the actual amount of time of the completed activity and the predicted amount of time of the incomplete activities to form a recalculated prediction time that it will take to manufacture the configuration; and report the recalculated prediction completion time as the configuration of the product is being manufactured.

18. The apparatus according to claim 17, wherein the processing unit further executes the computer usable code, for each incomplete activity of the plurality of activities, to define the one or more associated rules that state a predicted amount of time that it will take to complete the incomplete activity of the plurality of activities as a function of an actual amount of time taken for at least one completed activity of the plurality of activities.

19. The apparatus according to claim 17, wherein the processing unit further executes the computer usable code to monitor a completion status for each incomplete activity of the plurality of activities that indicates when each incomplete activity of the plurality of activities completes; and in response to one of the plurality of activities completing, update the predicted amount of time that it will take to complete incomplete activities of the plurality of activities using an actual amount of time that it took to complete completed activities in the plurality of activities, wherein the predicted amount of time is updated when each incomplete activity of the plurality of activities completes.

* * * * *